United States Patent
Evertz et al.

(10) Patent No.: US 7,776,488 B2
(45) Date of Patent: Aug. 17, 2010

(54) END PLATE FOR A STACK OF FUEL CELLS

(75) Inventors: Joerg Evertz, Zurich (CH); Matthias Guenthart, Aarau (CH); Uwe Werner, Birmensdorf/Aesch (CH)

(73) Assignee: Tribecraft AG (CH)

( * ) Notice: Subject to any disclaimer, the term of this patent is extended or adjusted under 35 U.S.C. 154(b) by 0 days.

(21) Appl. No.: 10/546,482

(22) PCT Filed: Feb. 19, 2004

(86) PCT No.: PCT/CH2004/000091

§ 371 (c)(1),
(2), (4) Date: Aug. 23, 2005

(87) PCT Pub. No.: WO2004/075330

PCT Pub. Date: Sep. 2, 2004

(65) Prior Publication Data

US 2006/0194094 A1  Aug. 31, 2006

(30) Foreign Application Priority Data

Feb. 23, 2003 (CH) .................................... 283/03

(51) Int. Cl.
*H01M 8/02* (2006.01)
(52) U.S. Cl. ....................... 429/511; 429/507
(58) Field of Classification Search ............... 429/37; 428/156, 172; 267/103–112, 158, 160
See application file for complete search history.

(56) References Cited

U.S. PATENT DOCUMENTS

| 6,040,072 | A | 3/2000 | Murphy |
| 6,057,053 | A | 5/2000 | Gibb |
| 6,428,641 | B1 | 8/2002 | Yoon et al. |
| 6,428,921 | B1 * | 8/2002 | Grot ............................ 429/37 |
| 6,645,659 | B2 * | 11/2003 | Bisaka et al. ................. 429/37 |
| 7,045,245 | B2 * | 5/2006 | Rock ............................ 429/37 |
| 2002/0022173 | A1 * | 2/2002 | Molter et al. ................. 429/37 |
| 2004/0142223 | A1 * | 7/2004 | Allen et al. ................... 429/34 |

FOREIGN PATENT DOCUMENTS

| DE | 101 35 025 A | 3/2002 |
| JP | 9-259916 | 10/1997 |
| JP | 9 283171 A | 10/1997 |
| JP | 2002 063930 A | 2/2002 |
| WO | WO 95/28010 | 10/1995 |

OTHER PUBLICATIONS

Patent Abstract of Japan, vol. 1998, No. 2 of Jan. 30, 1998.

* cited by examiner

*Primary Examiner* — Gregg Cantelmo
*Assistant Examiner* — Eugenia Wang
(74) *Attorney, Agent, or Firm* — Joyce von Natzmer; Pequignot + Myers LLC

(57) ABSTRACT

The inventive end plate comprises pressure shield (21) and a supporting plate (30), whereby the forces, which serve to compress the stack (1) of fuel cells (2) and which are introduced via the force introduction locations (24), are introduced into the stack in the form of a compressive load in a defined and uniform manner.

24 Claims, 7 Drawing Sheets

END PLATE FOR A STACK OF FUEL CELLS

This is the U.S. national stage of International application PCT/CH2004/000091, filed Feb. 19, 2004 designating the United States and claiming priority to Swiss application 283/03, filed Feb. 23, 2003. These applications are incorporated herein by reference in their entirety.

FIELD OF THE INVENTION

The present invention relates to an end plate for a stack of fuel cells, to a pressure plate and a bearing plate, from which an end plate according to the invention can be formed.

BACKGROUND OF THE INVENTION

Fuel cells or stacks of fuel cells are known. The individual fuel cell itself has a stacked structure comprising an electrolyte arranged between its outer plates. There is an anode between the electrolyte and one outer plate and a cathode between the electrolyte and the other outer plate. Solid and liquid electrolytes are known; the electrolyte can be held by a carrier structure or may itself have the required strength to allow it to be installed in the fuel cell, depending on whether a solid or liquid electrolyte is used. The operating temperatures also differ considerably, ranging from ambient temperature to several hundred degrees C. and above.

In one of the many known designs to which the invention can be applied, a polymer electrolyte membrane (PEM) is used in the fuel cell. In operation, then, by way of example hydrogen in gas form is fed to the anode side of the fuel cell and, for example, oxygen-containing ambient air is fed to the cathode side of the fuel cell.

In the context of the present description, for the sake of simplicity all the reaction partners which participate in the chemical reaction in a fuel cell are referred to as fuels, as are their carrier fluids (e.g. ambient air as a carrier fluid for the reaction partner $O_2$). The fuels are in fluid form. As has already been mentioned above, there are numerous embodiments of fuel cells with a very wide range of fuels, and the PEM fuel cell which is explained in more detail in the present context serves merely as an example which helps to explain the conditions.

In general, structures which serve as passages for the fuels to pass through are provided in the outer plates of the fuel cell, in such a manner that the electrolyte or membrane is covered with the fuels as uniformly as possible over the largest possible part of its area, which leads to the desired electrolytic reaction and therefore to the generation of current.

The sealing concept of the fuel cell is crucial, since if the sealing is inadequate, the reaction of the fuels as they mix with one another will be uncontrolled. In the case of the PEM fuel cell using hydrogen and oxygen as reaction partners, a leak leads to the detonating gas reaction. In general, special cord seals are used to reliably keep the fuels within their active regions. Of course, other sealing concepts are possible.

The individual cell generates only a relatively low voltage; by connecting the cells in series in a stack, it is possible to achieve a voltage which is adequate for the intended purpose and therefore sufficient power from the stack of fuel cells. Stacks of one hundred or more fuel cells are usual. Nowadays, stacks of PEM fuel cells with around a hundred cells, a power of 7 kw and a weight of approx. 20 kg are known.

In the stack, passages which run along the stack are used to supply the individual fuel cells with the fuels. Special cooling is often also provided, which likewise leads to passages for the coolant to flow to the individual fuel cells. Moreover, cooling passages are then to be provided in the individual fuel cell, and these in turn have to be kept sealed.

The result is that the routing of the media (fuels, coolants, etc.) in the stack requires special design precautions as well as the sealing concept. The passages for supplying the media are often integrated in the outer plates of the individual fuel cell.

Finally, it should be taken into account that the series connection of the fuel cells in the stack leads to the flow of current which is generated by the stack flowing through the stack itself, i.e. from fuel cell to fuel cell, in each case through the outer plates thereof, which are in contact directly or via intermediate layers.

Therefore, the contact resistance between the elements which are in contact with one another becomes critical for the power of the stack of fuel cells: in the abovementioned, standard stack, there are in each case a hundred electrodes and outer plates, resulting in several hundred contact surfaces with a corresponding contact resistance.

Fixing of a stack of fuel cells by clamping is in widespread use. End plates provided at the ends of the stack are connected to one another via tie rods running along the stack and exert pressure on the stack, which holds the individual elements of the fuel cells and the fuel cells themselves in position in the stack.

The pressure required is considerable:

firstly, the fuels have to be passed through the fuel cell at a pressure which may quite easily be 2 to 3 bar.

Then, the seals have to be held under pressure, which likewise requires a pressure of the abovementioned order of magnitude of another 2 to 3 bar.

Finally, the contact resistance of the outer plates (generally graphite plates) is directly dependent on the contact pressure, which leads to the latter being very high.

The result of this is that in a conventional stack of fuel cells with 4 to 6 tie rods, each tie rod introduces a force of $10^4$ N into the end plate, which leads to the required compressive load over the cross-sectional area of the stack of, for example, 100 to 300 $cm^2$.

This compressive load should be as uniform as possible, since the majority of the cross section of the stack, i.e. of the surface area of the outer plates or the membrane of the individual cell, is (has to be) available for routing the fuels for the electrochemical reaction where substantially uniform conditions are present. Different requirements may apply in the edge regions of the cell, e.g. at cutouts for the tie rods or at the passages for routing the media to the individual cells.

As a result, a defined uniform compressive load is required over the cross section of the stack of fuel cells, as will be provided by the person skilled in the art for the corresponding structural design of the cell. As has been mentioned, therefore, in the context of the invention, a "defined uniform compressive load" is to be understood as meaning a load which does change, including a load with sudden jumps in pressure, but on the proviso that the change in load or any sudden jumps in pressure are defined in a desired way by the person skilled in the art, so that every region in the fuel cell is subject to optimum pressure. Apart from special applications, however, it will be the case that only minor changes in load are desired and there will be no sudden jumps in pressure.

The clamping forces which are introduced into the end plate at the edge sides by the tie rods cause the end plate to bend with respect to its bearing surface on the stack, with the result that the stack, as seen in cross section, is subject to high compressive loads at the edge sides and to only light compressive loads in the center, which contradicts the desired, defined uniform loading.

Consequently, end plates are often designed as solid, heavy elements reminiscent of armor plating. In particular a high weight and a high consumption of material are undesirable if it is to be possible for the stack of fuel cells to be used in mobile applications, such as for example vehicles, aircraft, etc., or if they are to be kept portable in general.

The prior art has disclosed numerous embodiments of end plates by which the desired, defined uniform compressive loading of the stack of fuel cells can be achieved more successfully at a reduced weight or deployment of material.

For example, WO 95/28010 shows a stack of fuel cells which are rectangular in cross section and having in each case four tie rods acting on one set of opposite sides, while two brackets, the ends of which are likewise subjected to load by tie rods, are provided on the opposite set of sides.

U.S. Pat. No. 6,428,921 shows a stack of fuel cells which are rectangular in cross section with tie rods running along the corners and acting on a double end plate. The outer plate has threaded bores into which bolts can be screwed so that they are then supported on the inner plate. Under operating load, the inner plate is prevented from bending outward, since screwing the bolts in sufficiently applies load in the inner region of the inner plate.

US 2002/0110722 shows an end plate with a set of springs arranged in the inner region on its side facing the stack; this set of springs exerts compressive load on the inner region of the stack even in the event of bending of the end plate under the clamping forces acting via the tie rods.

JP 9-259916 shows an embodiment with brackets which are subject to load from the tie rods, run in the inner region over the end plate and act on the end plate via local bearings.

The result of these embodiments is that the compressive load acts to an increased degree not only in the edge regions of the stack but also in the inner region. However, despite the conditions being improved, a defined uniform loading is scarcely achievable, and consequently locally elevated compressive forces still have to be used in order to maintain a minimum pressure at the locations which are not subject to direct compressive loading.

U.S. Pat. No. 6,040,072 shows a double end plate, the outer plate of which is thickened in the center but thinner at the edge sides, so that it bears centrally against the inner plate. Under operating load of the tie rods, the result is deformation of the outer plate, in such a manner that it then bears against the entire surface facing the inner plate in one plane, resulting in an improved compressive loading of the stack.

It is known to calculate the change in thickness of the outer plate by numerical methods with a view to achieving the desired, defined uniform compressive loading. Modern machining methods allow sufficiently accurate reproduction of the nonuniformly curved surfaces of end plates of this type.

For example in the case of a stack which is rectangular in cross section, the curvature may take place in one but preferably two directions (corresponding to the sides of the stack).

However, a drawback which remains is still the high weight of an end plate of this type, since the thickness required remains considerable. In the abovementioned example of a stack of 20 kg, some 2 kg is attributable to the end plates, even though they are made from aluminum. The accurate machining of the surface contour is also complex, in particular for series production.

A fin structure makes it possible to reduce the weight of an end plate of this type, but this further increases the outlay on machining. Numerical calculation models lead to structures which come very close to the desired compressive loading of the stack with the weight reduced still further. However, the outlay involved in producing structures of this type is huge.

Accordingly, the object of the present invention is to provide an improved end plate for a stack of fuel cells which allows a defined uniform compressive loading of the stack under operating load.

This object is achieved by the end plate, the pressure plate and the bearing plate described herein.

SUMMARY OF THE INVENTION

The present invention is directed towards an end plate for a stack of fuel cells, having at least one force introduction location for forces for clamping the stack and a pressure shield, which extends substantially over its entire cross-sectional area, is operationally connected to the at least one force introduction location, and is curved convexly in at least one direction toward the stack as well as means for the predetermined stabilizing of the shield convexity under load, and having further means, which are arranged on its convex side and can be supported on the stack, for transmitting defined, uniform pressure exerted by the shield to the adjoining stack.

The means for stabilizing the shield convexity may be designed as a tension element which engages on the edge regions of the shield and stabilizes the edge regions at the predetermined distance from one another under the operating load of the shield.

The further means may have pressure fins, arranged perpendicular to the shield surface, for absorbing the operating load of the shield.

The end plate may have a plurality of force introduction locations for forces for clamping the stack which are arranged at the edge regions of the shield.

One force introduction location for forces for clamping the stack may be provided, and the shield may be formed symmetrically or rotationally symmetrically with respect to an axis of symmetry which runs perpendicularly through the end plate and coincides with a longitudinal axis of the stack, the force introduction location may lie on the axis of symmetry, and the edge regions of the shield may run along the periphery of the end plate and may be stabilized by a tension element which acts on the edge regions and which may be designed as a clamping ring.

The end plate may be of two-part design, comprising a pressure plate and a bearing plate, and the pressure plate may include the at least one force introduction location for the forces for clamping the stack as well as the pressure shield, the pressure plate and bearing plate may be designed for operational interaction by nonpositive and/or positive locking.

The end plate, which may be rectangular, for a stack of fuel cells which is rectangular in cross section, may comprise a pressure shield that is convex in only one direction and has surface lines which are parallel to one another and to two opposite edge regions of the end plate, the corresponding edge regions of the end plate and of the shield may in each case coincide and have the force introduction locations.

The stabilizing tension element may hereby connect the edge regions of the shield to one another and may preferably be designed as a tension plate which extends over the entire length of the connected edge regions.

The rectangular end plate may have a pressure plate that is designed as an extruded section, preferably of aluminum, which is substantially D-shaped in cross section.

The pressure shield which is curved convexly toward the stack allows the clamping forces which act at the force introduction locations to be introduced in a defined uniform way into the bearing region. This eliminates the need for designs with transverse brackets, sets of springs, etc.; there is also no need for a solid, thick end plate of considerable weight and entailing considerable manufacturing outlay for machining a specially curved surface which bears flat against the stack under load. Over and above the object set, can the shield convexity can optionally be selected in such a manner by the person skilled in the art, using known calculation methods, that the shield itself is subject substantially only to compressive load by the reaction forces exerted by the bearing region. Consequently, the demands imposed on the rigidity of the pressure shield are low, allowing it to be of correspondingly thin design. It is in this way possible to produce a particularly lightweight end plate.

The means for the predetermined stabilization of the shield convexity under load prevent the shield from widening or prevent deformation to the shield convexity in such a manner as to produce a different load, e.g. a shear load, with the result that the shield region would then have to be correspondingly made thicker. According to the invention, the shield remains stable under the maximum load from the clamping forces, on the one hand, and the compressive load from the bearing region.

The bearing region acts as a transition element from the curved pressure shield to the next, planar element of the stack of fuel cells that is to be fixed, and transmits only the desired compressive forces to this stack.

An embodiment of a two-part end plate is particularly advantageous. The pressure plate can be produced as an aluminum extruded section with a D-shaped cross section, with the curved part of the D corresponding to the pressure shield and the straight back of the D corresponding to the tensioning plate. The weight of a structure of this type is advantageously low; the use of extruded sections is expedient in series production. The bearing plate is then provided with a set of fins which on one side adjoin the curve of the D as a negative and on the other side, parallel to the back of the D, form the connection surface to the first element of the stack. Weight and production costs are just as favorable as with the pressure plate.

The curvatures of the surfaces of shield and bearing plate which interact with one another as described above may differ in a predetermined way, with the active surface of the shield being curved to a greater extent that the corresponding surface of the bearing plate, in such a manner that the active surface of the shield, under operating load, can be widened in a predetermined way and can be pressed in a defined, uniform way against the entire corresponding surface of the bearing plate.

In such an embodiment, a gap may be provided between the interacting surfaces of pressure shield and bearing plate, with the gap widening outward starting from a contact location. This allows a predetermined deformation of the pressure shield, which assists with the defined uniform transmission of pressure from the pressure shield to the bearing plate. An optimization of this nature takes account of the fact that no component is absolutely rigid, and consequently makes deliberate use of the elastic deformation which always occurs. The person skilled in the art will preferably design this gap in such a way that the pressure shield under operating load to a certain extent rolls into the bearing plate and then, in the load-deformed position, is only under compressive load.

The invention is also directed to a pressure plate for a stack of fuel cells for operational interaction with a bearing plate, comprising at least one force introduction location for forces for clamping the stack and a pressure shield, which extends substantially over its entire surface, is operationally connected to the at least one force introduction location and is convexly curved in at least one direction toward a bearing plate, as well as means for the predetermined stabilization of the shield convexity under load.

Such a pressure plate can be combined with a bearing plate designed in any desired way, provided that the latter adjoins the pressure shield in the form of the negative.

The present invention is also directed to a bearing plate for a pressure plate of a stack of fuel cells, comprising pressure fins for absorbing the operating load of a pressure shield by way of the outer surfaces thereof bearing against the shield convexity, and a planar bearing surface, which is on the opposite side remote from the outer sides of the pressure fins, to provide support against an adjoining element of the stack of fuel cells.

Such a bearing plate can be combined with a pressure plate of any desired design, provided that the latter adjoins it in the style of the positive.

Particular embodiments are described in more detail below with reference to the figures, in which:

DESCRIPTION OF VARIOUS AND PREFERRED EMBODIMENTS OF THE INVENTION

Figure 1:
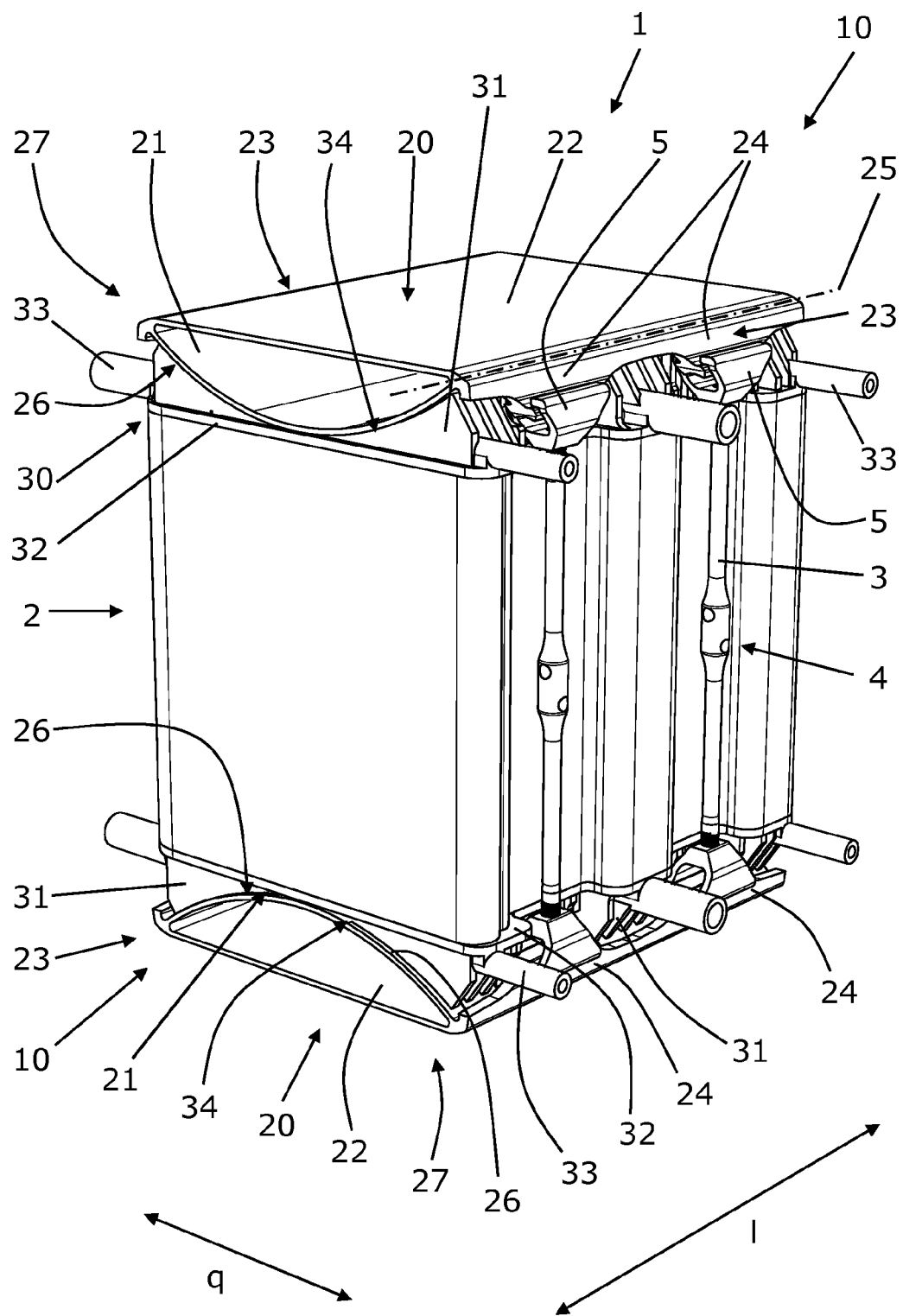
FIG. 1 diagrammatically depicts a perspective view of a stack of fuel cells provided with end plates according to the invention, FIG. 2 diagrammatically depicts a perspective view of a pressure plate according to the invention, FIG. 3 diagrammatically depicts a perspective view of a bearing plate according to the invention, FIG. 4 diagrammatically depicts a pressure plate according to the invention with a plurality of segments, FIG. 5 diagrammatically depicts a pressure plate according to the present invention curved in two directions, and FIG. 6 diagrammatically depicts a rotationally symmetrical end plate with a corresponding bearing plate.

FIG. 1 shows a rectangular stack 1 of fuel cells with rectangular end plates 10 and fuel cells 2 which are stacked on top of one another and are clamped together by means of the end plates 10. Tie rods 3 connect the end plates 10 to one another and can be tensioned by way of screw threads (not shown) with a tensioning member 4, so that the tie rods 3 introduce the forces for clamping the stack 1 into the end plates.

A layout of this nature is fundamentally known.

According to the invention, the end plates 10 are of two-part design; there is in each case one pressure plate 20 and one bearing plate 30.

The pressure plate 20 has a pressure shield 21 and a tension element as means for the predetermined stabilization of the shield convexity under load, which is in this case designed as a tension plate 22. Pressure shield 21 and tension plate 22 are connected to one another at their respective, opposite edge regions 23. The force introduction locations 24 of the tie rods 3 lie in the edge regions 23. The plane of the tension plate 22 intersects the pressure shield 21 in a straight intersection line 25 indicated by dot-dashed lines. The force introduction locations 24 preferably lie on or as close as possible to the intersection lines 25, which minimizes the loading of the pressure plate 20 under operating load and allows the pressure plate 20 to be of material-saving design.

The pressure shield 21 is curved convexly toward the bearing plate in one direction (in this case in the transverse direction q of the stack 1) and has parallel surface lines (running in the longitudinal direction 1 of the stack 1), which for their part run parallel to the edge regions 23. When seen in cross section, the pressure plate 20 has a D-shaped profile.

A convex side 26 of the pressure shield, under operating load, bears in the style of a negative form against the correspondingly designed bearing plate 30, while the tension plate 22 engages (in the edge regions 23) on its concave side 27.

As a result of the convex shield curvature, the pressure shield 21 exerts a defined, uniform compressive load on the bearing region 30, which is transmitted by the latter to a fuel cell 2 which adjoins it (or to another, adjoining element of the stack 1). Consequently, the fuel cells 2 are under the desired, defined uniform load. The tension plate 22 stabilizes the shield convexity under load by acting on the edge regions 23 of the pressure shield 21 and thereby fixing the pressure shield in place.

The bearing plate 30 has pressure fins 31 with outer surfaces 34, the pressure fins 31 projecting perpendicularly from the pressure shield 21 and over their outer surfaces 34 forming the negative form against which the pressure shield 21 bears. Consequently, the pressure fins 31 absorb the operating load of the pressure shield 21 and in the present case are connected to one another by means of a baseplate 32; the latter in turn bears against the adjoining element or an adjoining fuel cell 2 of the stack 2. The baseplate 32 holds the pressure fins 31 in position, and these fins in turn introduce the operating load from the pressure shield 21 into the stack 1.

Media-carrying passages 33, which connect the supply passages for fuels, coolant, etc., which run along the stack 1 and are not shown in the figure, to the outside world, are also illustrated. Supply passages for feeding the individual fuel cells 2 which run along the stack 1 are known. It is advantageous that the use of the bearing plate 30 according to the invention means that there is no need for a special element for connecting the supply passages to the outside world.

The convexity of the pressure shield can be calculated by the person skilled in the art and is determined as a function of the desired, defined uniform compressive loading of the fuel cells 2. Since every structure is elastically deformed under load, it is advantageous for the curvature of the pressure shield 21 to be selected to be slightly greater than the curvature of the outer surfaces 34 of the pressure fins 31. Consequently, without operating load, the pressure shield 21 bears centrally in the bearing surfaces 34, but under operating load comes to bear completely and in a defined uniform way against the outer surfaces 34 of the pressure fins 31 by virtue of the fact that it can be widened in a predetermined way under this operating load, with the result that the calculated compressive load distribution also occurs under real conditions. This deformation can likewise be calculated by the person skilled in the art, including the deformation to the tension plate 22.

In accordance with the curvature of the pressure shield 21 in only one direction, the transverse direction q, there is no defined, uniform compressive loading in the longitudinal direction 1. This drawback is only apparently present:

firstly, the tie rods 3 can now be arranged offset from the corners of the stack 1 more toward the center of its longitudinal side, so that the undesired differences in load are reduced.

Furthermore, tie rods 3 can be provided in any desired number, and consequently the differences in load can be reduced in a predetermined way.

Finally, the dimensions of the bearing plate 30 can be adapted: under operating load, applied at the force introduction locations 24, the end plate 30 is deformed in wavy fashion along the edge regions 23 that include the force introduction locations 24. This deformation can be calculated and then the corresponding negative established. In other words, a negatively wavy bearing plate which is then deformed to be planar under operating load is produced.

The result of the pressure shield which is curved in only one direction according to the invention is that the defined, uniform compressive load is produced over the entire cross-sectional area of the stack 1.

For series production of a stack 1 of fuel cells, it is advantageous for the pressure plate 20 to be produced from an extruded section. The bearing plate 30 with its pressure fins 31 arranged perpendicular to the baseplate 32 is likewise easy to produce. The end plate 10 which is thereby formed according to the invention has a low weight with low production costs.

Figure 2:
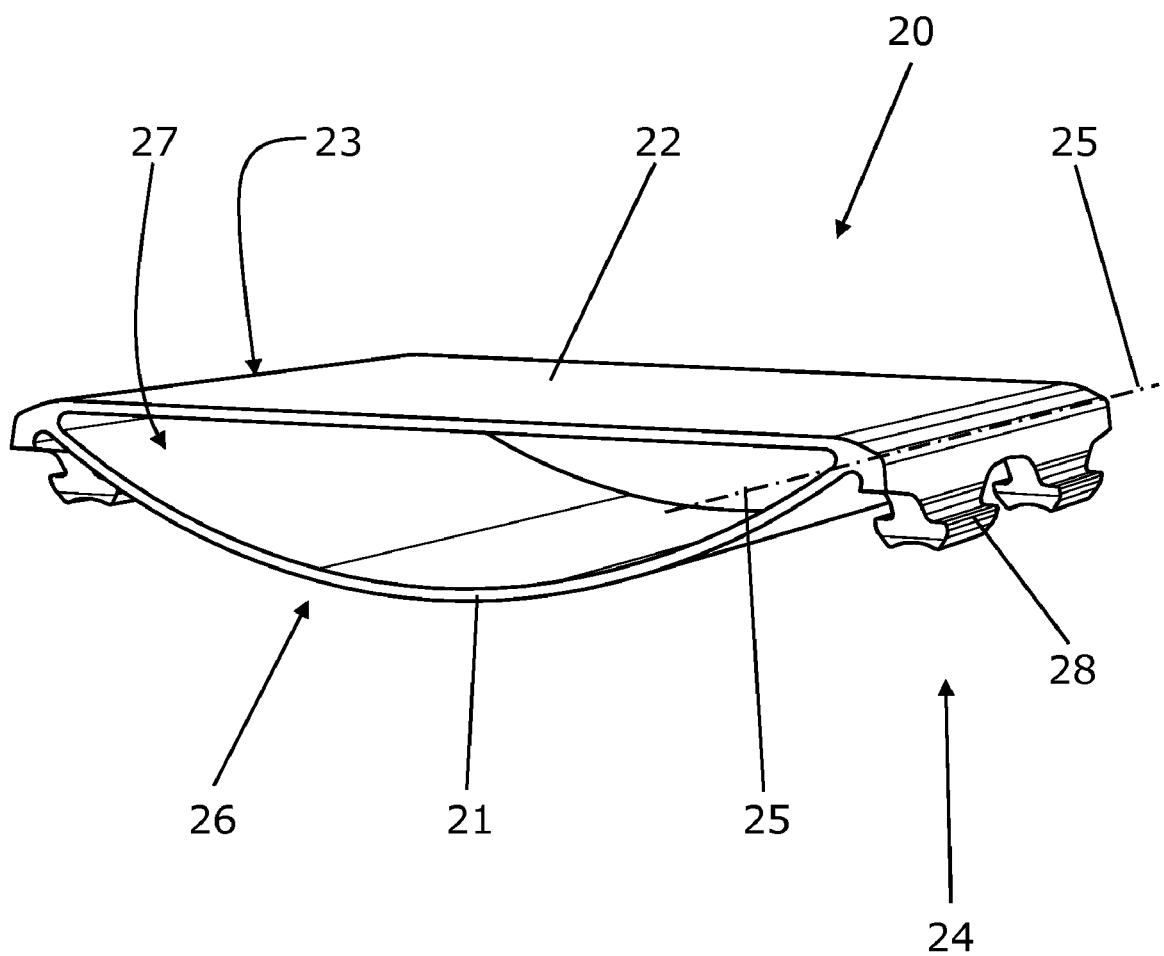

FIG. 2 shows a perspective view of a pressure plate 20 according to the invention. The figure illustrates the force introduction locations 24 for the tie rods 3, which engage by way of their tong-like grippers 5 (FIG. 1), on correspondingly designed mating pieces 28 of the pressure plate 20. Mating pieces of this type can easily be formed on the extruded section produced in an extrusion process.

In operation, pressure plate 20 and bearing plate 30 are nonpositively connected to one another; if the grippers 5 and the mating pieces 28 are of suitable design, the grippers laterally surround the bearing plate 30, which in addition to the nonpositive lock also results in a positive locking of the plates (20, 30) and connects the two plates to form an assembly, the end plate 10.

Figure 3:
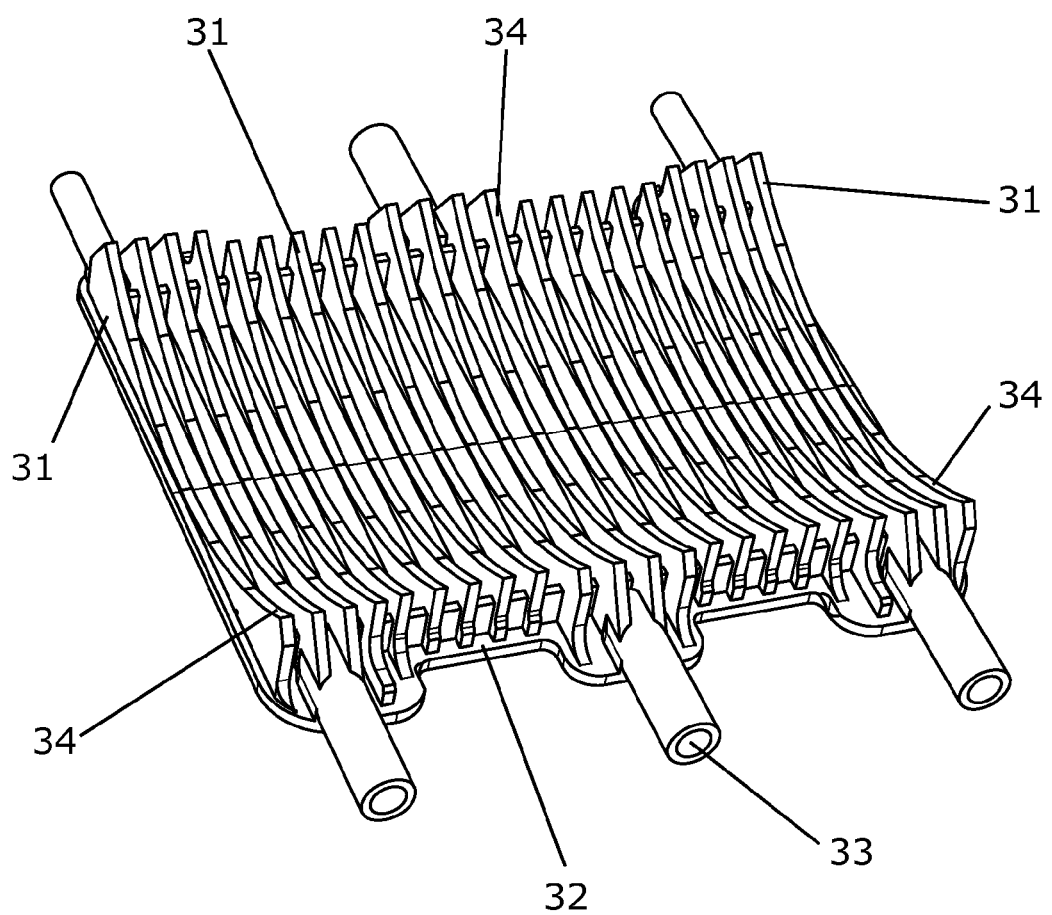

FIG. 3 shows a perspective view of a bearing plate 30 according to the invention. The figure illustrates the baseplate 32 with the pressure fins 31 and their outer surfaces 34, against which the pressure shield 21 comes to bear. The media-routing passages 33, which guide the media laterally into the bearing plate 30 and then pass them downward at right angles into the stack 1, are also illustrated.

Figure 4:
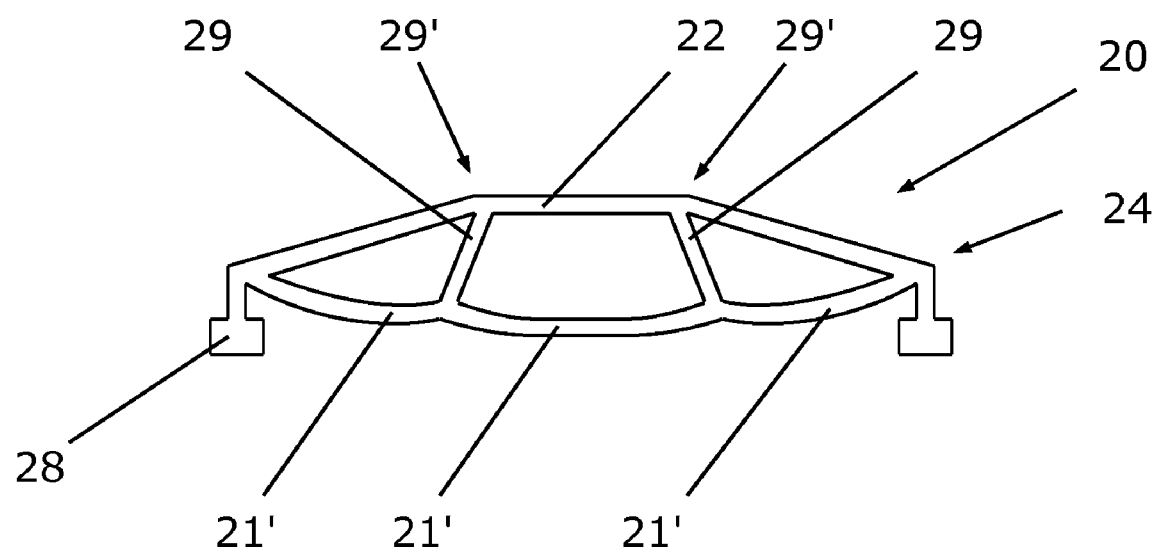

FIG. 4 diagrammatically depicts a pressure plate according to the invention with a plurality of segments. Transverse webs 29 divide the pressure shield 21 into a plurality of segments 21'. As a result, under operating load, each segment 21' is loaded in the same way as the shield 21 (FIG. 2). As a result, separate cavities are formed in the pressure plate, which has the advantage that the pressure plate can be used, for example, for routing the media. A further advantage of dividing the pressure shield 21 into segments 21' is that the overall size of both the pressure plate 20 and of the bearing plate 30 is reduced.

The use of transverse webs 29 leads, at the location of the connection to the tension plate 22, to a kink 29' in the latter, so that the forces at the location of the connection cumulatively amount to zero, and consequently the tension plate, as before, is still exposed substantially only to tensile forces.

Figure 5:
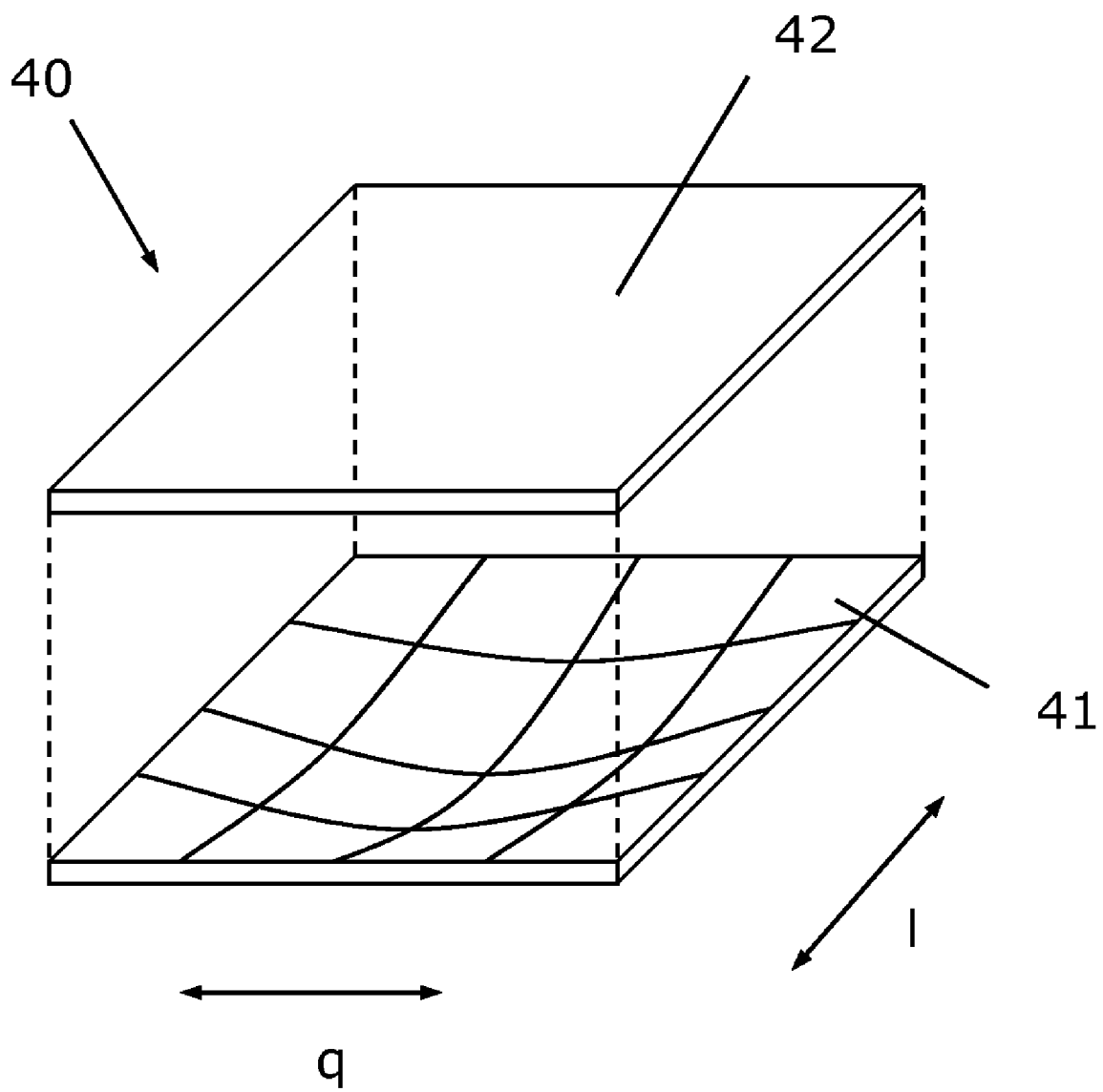

FIG. 5 diagrammatically depicts a pressure plate 40 which is curved in two directions, having a pressure shield 41 and a tension plate 42; consequently, a defined uniform compressive loading of the fuel cells 2 can be achieved in the longitudinal direction l and in the transverse direction q. The tension plate 41 can be fixed on the pressure shield 41 by conventional mechanical means, not illustrated in the figure, such as a screw connection or adhesive bonding, etc. The curvature of the pressure shield 41 can be determined numerically by the person skilled in the art.

Figure 6:
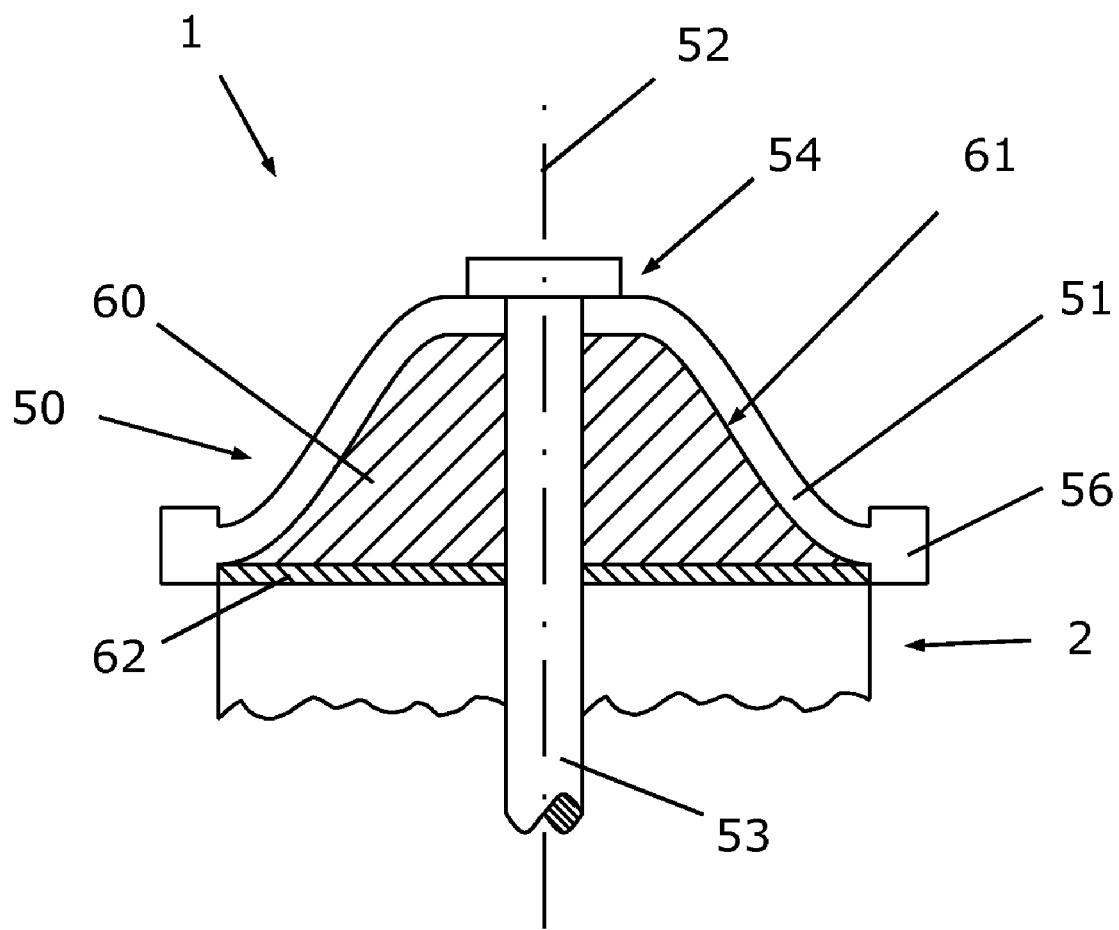

FIG. 6 diagrammatically depicts a cross section through a rotationally symmetrical end plate 50 in accordance with the present invention. A pressure shield 51 is of rotationally symmetrical design and has an axis of symmetry 52. The pressure shield 51 is subject to load by a single tie rod 53 lying on the axis of symmetry 52 at the location of the force introduction location 54. Means for the predetermined stabilization of the shield convexity are designed as a clamping ring 56 formed integrally on the pressure shield 51.

Pressure fins 60 with bearing surfaces 61 for the pressure shield introduce the compressive loading, via a baseplate 62, into the adjacent fuel cells 2 of the stack 1.

The end plate 50 may comprise a pressure plate, comprising the pressure shield 51, the clamping ring 56 and the force introduction location 54, as well as a bearing plate having the pressure fins 60 and the baseplate 62. The figure illustrates an integral design of the end plate 50; the baseplate 62 may optionally then be omitted.

It can be seen from the figure that the axis of symmetry 52 coincides with the axis of symmetry of the stacked fuel cells 2.

Figure 7:
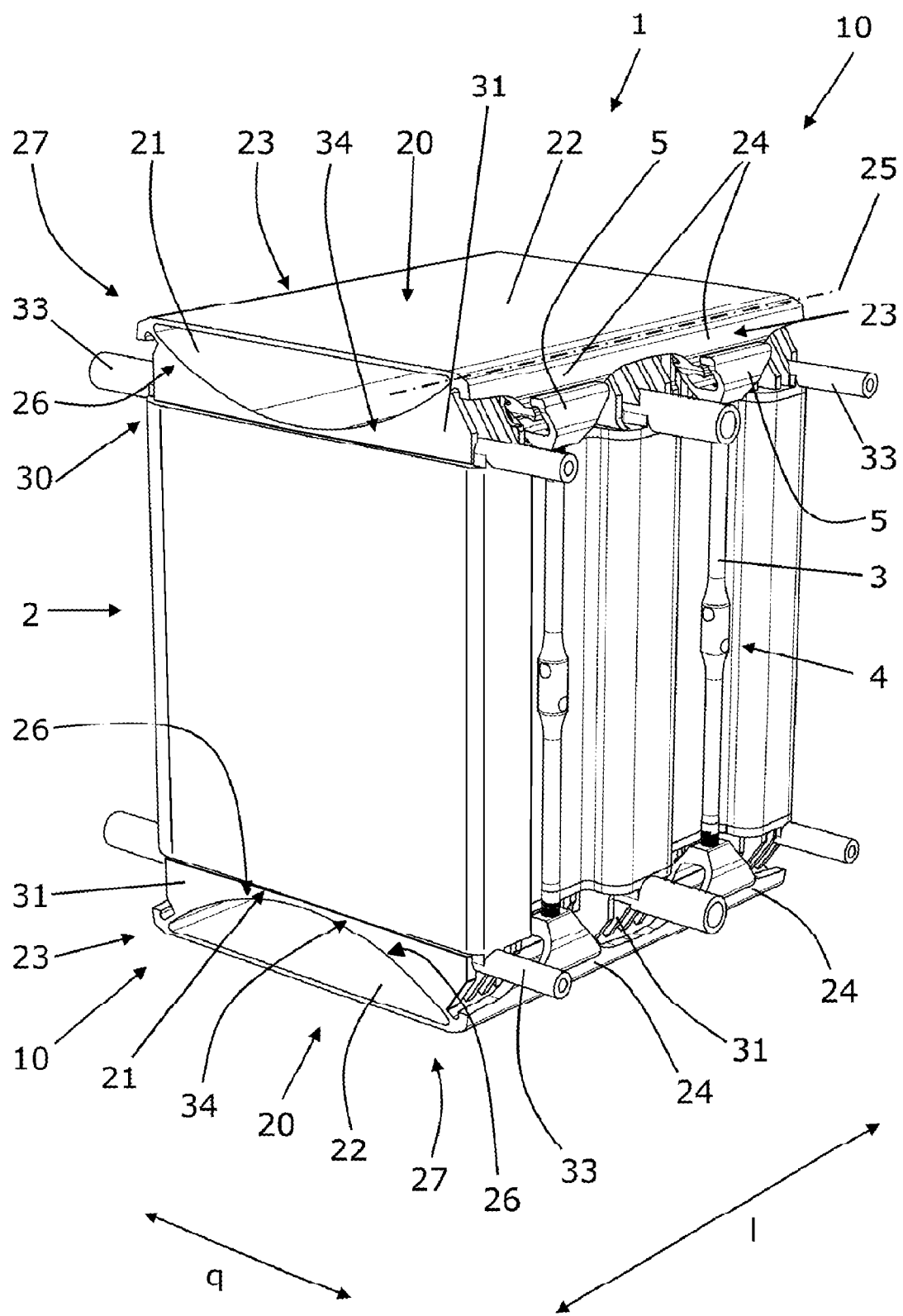
FIG. 7 diagrammatically depicts a perspective view of a stack of fuel cells provided with end plates according to the invention with a single piece design.

It is also possible for the end plate 10 (FIG. 1) to be of single-piece design, in which case the baseplate 32 can optionally likewise be omitted (FIG. 7). In this case, the length of the pressure fins 31 between pressure shield 21 and adjoining element of the stack 1 is advantageously formed in such a way that without operating load the pressure fins are only in contact with the center of the adjoining element of the stack 1, but are at a distance from it at the edge sides. This distance is dimensioned in such a way by the person skilled in the art that it drops to zero under operating load. As a result, under operating load, the pressure fins come to bear flat against the adjoining element of the stack 1; the desired, defined uniform compressive load is introduced into the stack 1.

What is claimed is:

1. An end plate for a stack of fuel cells comprising
at least one force introduction location for forces for clamping the stack,
a pressure shield, which
extends substantially over the fuel cell stack's entire cross-sectional area,
is operationally connected to the at least one force introduction location, and
is curved convexly in at least one direction toward the stack to form, in cross-section, a curved part of a D-shape,
at least one predetermined stabilizing device forming the straight back of said D-shape, wherein said device stabilizes convexity of the pressure shield under load and wherein said pressure shield and said at least one stabilizing device are connected to one another at their respective, opposite edge regions to form said D-shape, and
transmitting devices arranged on a convex side of the pressure shield and which can be supported on the stack, wherein said transmitting devices transmit defined, uniform pressure exerted by the pressure shield to the adjoining stack.

2. The end plate of claim 1, wherein the at least one stabilizing device is designed as a tension element which engages on said opposite edge regions of the pressure shield and stabilizes the edge regions at a predetermined distance from one another under an operating load of the pressure shield.

3. The end plate of claim 2 for a stack of fuel cells which is rectangular in cross section, wherein the end plate is rectangular, and
wherein the pressure shield is convex in only one direction and wherein said one direction extends parallel to two opposite edge regions of the end plate, the corresponding edge regions of the end plate and of the shield in each case coinciding and having the force introduction locations.

4. The end plate of claim 2, wherein the tension element is a tension plate.

5. The end plate of claim 1, having a plurality of force introduction locations for forces for clamping the stack, wherein the force introduction locations are arranged at edge regions of the pressure shield.

6. The end plate of claim 1 being of two-part design and, comprising
a pressure plate and a bearing plate,
wherein the pressure plate includes the at least one force introduction location for the forces for clamping the stack as well as the pressure shield, and
wherein the pressure plate and bearing plate are designed for operational interaction by nonpositive and/or positive locking.

7. The end plate of claim 6, wherein the curvatures of the surfaces of the shield and the bearing plate which interact with one another differ in a predetermined way, with an active surface of the pressure shield being curved to a greater extent than the corresponding surface of the bearing plate so that the active surface of the pressure shield, under operating load, can be widened in a predetermined way and can be pressed in a defined, uniform way against the entire corresponding surface of the bearing plate.

8. The end plate of claim 6 for a stack of fuel cells which is rectangular in cross section,
wherein the end plate is rectangular, and
wherein the pressure shield has a convex and a concave side and is convex in only one direction and wherein said one direction extends parallel to two opposite edge regions of the end plate, the corresponding edge regions of the end plate and of the pressure shield in each case coinciding and having the force introduction locations.

9. The end plate of claim 8, wherein the at least one stabilizing device is designed as a stabilizing tension element and wherein the stabilizing tension element connects the edge regions of the pressure shield to one another.

10. The end plate of claim 9, wherein said stabilizing tension element is designed as a tension plate which extends over the entire length of the connected edge regions.

11. The end plate of claim 6, wherein the bearing plate further comprises passages for carrying the media of a stack of fuel cells.

12. The end plate of claim 1, wherein the transmitting devices have passages for carrying media.

13. The end plate of claim 1, wherein the pressure shield which is curved convexly in at least one direction toward the stack has a convex side towards the stack and a concave side away from the stack.

14. An end plate for a stack of fuel cells comprising
at least one force introduction location for forces for clamping the stack,
a pressure shield, which
extends substantially over the fuel cell stack's entire cross-sectional area,
is operationally connected to the at least one force introduction location, and
is curved convexly in at least one direction toward the stack, at least one predetermined stabilizing device, wherein said device stabilizes convexity of the pressure shield under load, and having transmitting devices arranged on a convex side of the pressure shield and which can be supported on the stack, wherein said transmitting devices transmit defined, uniform pressure exerted by the pressure shield to the adjoining stack, and have pressure fins, arranged perpendicular to the pressure shield surface, for absorbing an operating load of the pressure shield.

15. An end plate for a stack of fuel cells comprising at least one force introduction location for forces for clamping the stack, a pressure shield having a convex side and a concave side, which extends substantially over the fuel cell stack's entire cross-sectional area, is operationally connected to the at least one force introduction location, and is curved convexly in at least one direction toward the stack, at least one predetermined stabilizing device, wherein said device stabilizes convexity of the pressure shield under load and wherein said pressure shield and said at least one stabilizing device are connected to one another at their respective, opposite edge regions, and transmitting devices arranged on the pressure shield, wherein said transmitting devices transmit defined, uniform pressure exerted by the pressure shield to the adjoining stack, wherein one force introduction location for forces for clamping the stack is provided, and wherein the pressure shield is rotationally symmetrical with respect to an axis of symmetry which runs perpendicularly through the end plate and coincides with a longitudinal axis of the stack, wherein the force introduction location lies on the axis of symmetry, and edge regions of the shield run along the periphery of the end plate and are stabilized by a tension element which acts on the edge regions and is designed as a clamping ring.

16. An end plate for a stack of fuel cells comprising at least one force introduction location for forces for clamping the stack which is rectangular in cross section, a pressure shield, which extends substantially over the fuel cell stack's entire cross-sectional area, is operationally connected to the at least one force introduction location, and is curved convexly in at least one direction toward the stack, at least one predetermined stabilizing device, wherein said device stabilizes convexity of the pressure shield under load and wherein said pressure shield and said at least one stabilizing device are connected to one another at their respective, opposite edge regions, and transmitting devices arranged on a convex side of the pressure shield and which can be supported on the stack, wherein said transmitting devices transmit defined, uniform pressure exerted by the pressure shield to the adjoining stack, wherein the at least one stabilizing device is designed as a tension element which engages on said opposite edge regions of the pressure shield and stabilizes the edge regions at a predetermined distance from one another under an operating load of the pressure shield, wherein the end plate is rectangular, wherein the pressure shield is convex in only one direction and wherein said one direction extends parallel to two opposite edge regions of the end plate, the corresponding edge regions of the end plate and of the shield in each case coinciding and having the force introduction location(s), and wherein the endplate is of single piece design.

17. The end plate of claim 16, wherein said stabilizing element is designed as a tension plate which extends over the entire length of the connected edge regions.

18. An end plate for a stack of fuel cells comprising at least one force introduction location for forces for clamping the stack which is rectangular in cross section, a pressure plate, wherein the pressure plate is designed as an extruded section and is substantially D-shaped in cross section to provide a D-shape, with a curved part of the D-shape corresponding to a pressure shield and a straight back of the D-shape corresponding to a tension element wherein the pressure shield, which extends substantially over the fuel cell stack's entire cross-sectional area, is operationally connected to the at least one force introduction location, and is curved convexly in at least one direction toward the stack, at least one predetermined stabilizing device, wherein said device stabilizes convexity of the pressure shield under load and wherein said pressure shield and said at least one stabilizing device are connected to one another at their respective, opposite edge regions, and transmitting devices arranged on a convex side of the pressure shield and which can be supported on the stack, wherein said transmitting devices transmit defined, uniform pressure exerted by the pressure shield to the adjoining stack, wherein the at least one stabilizing device is designed as the tension element which engages on said opposite edge regions of the pressure shield and stabilizes the edge regions at a predetermined distance from one another under an operating load of the pressure shield, wherein the end plate is rectangular, and wherein the pressure shield is convex in only one direction and wherein said one direction extends parallel to two opposite edge regions of the end plate, the corresponding edge regions of the end plate and of the shield in each case coinciding and having the force introduction location(s).

19. The end plate of claim 18, wherein the pressure plate is designed aluminum.

20. An end plate for a stack of fuel cells comprising at least one force introduction location for forces for clamping the stack, a pressure shield, which extends substantially over the fuel cell stack's entire cross-sectional area, is operationally connected to the at least one force introduction location, is curved convexly in at least one direction toward the stack, and is divided by integrally formed transverse webs into a plurality of segments, at least one predetermined stabilizing device, wherein said device is a tension element and stabilizes a convexity of the pressure shield under load and wherein said integrally formed transverse webs result in (1) separate cavities within a pressure plate comprising the pressure shield and said tension element and (2) kinks in said tension element, so that, where the webs are connected to the tension element, forces cumulatively amount to zero, and transmitting devices arranged on a convex side of the pressure shield and which can be supported on the stack, wherein said transmitting devices transmit defined, uniform pressure exerted by the pressure shield to the adjoining stack.

21. The end plate of claim 20, wherein the tension element is a tension plate.

22. An end plate for a stack of fuel cells comprising
at least one force introduction location for forces for clamping the stack which is rectangular in cross section,
a pressure shield, which
extends substantially over the fuel cell stack's entire cross-sectional area,
is operationally connected to the at least one force introduction location,
and
is curved convexly in at least one direction toward the stack,
at least one predetermined stabilizing device, wherein said device stabilizes convexity of the pressure shield under load and wherein said pressure shield and said at least one stabilizing device are connected to one another at their respective, opposite edge regions, and
transmitting devices arranged on a convex side of the pressure shield and which can be supported on the stack, wherein said transmitting devices transmit defined, uniform pressure exerted by the pressure shield to the adjoining stack,
wherein the end-plate is of two-part design and, comprises
a pressure plate and a bearing plate,
wherein the pressure plate includes the at least one force introduction location for the forces for clamping the stack as well as the pressure shield,
wherein the pressure plate and bearing plate are designed for operational interaction by nonpositive and/or positive locking,
wherein the end plate is rectangular, and
wherein the pressure shield has a convex and a concave side and is convex in only one direction and wherein said one direction extends parallel to two opposite edge regions of the end plate, the corresponding edge regions of the end plate and of the pressure shield in each case coinciding and having the force introduction locations,
wherein the at least one stabilizing device is designed as a stabilizing tension element and wherein the stabilizing tension element connects the edge regions of the pressure shield to one another,
wherein said stabilizing tension element is designed as a tension plate which extends over the entire length of the connected edge regions, and
wherein the pressure plate is designed as an extruded section, and is substantially D-shaped in cross section to provide a D-shape, with a curved part of the D-shape corresponding to the pressure shield and a straight back of the D-shape corresponding to the tension plate.

23. The end plate of claim 22, wherein the pressure plate is designed of aluminum.

24. An end plate for a stack of fuel cells being of two-part design and, comprising
a pressure plate and a bearing plate,
wherein the pressure plate includes the at least one force introduction location for the forces for clamping the stack as well as a pressure shield, and
wherein the pressure plate and bearing plate are designed for operational interaction by nonpositive and/or positive locking, and wherein the pressure shield
extends substantially over the fuel cell stack's entire cross-sectional area,
is operationally connected to the at least one force introduction location,
and
is curved convexly in at least one direction toward the stack,
at least one predetermined stabilizing device, wherein said device stabilizes convexity of the pressure shield under load, and having
transmitting devices arranged on a convex side of the pressure shield and which can be supported on the stack, wherein said transmitting devices transmit defined, uniform pressure exerted by the pressure shield to the adjoining stack,
wherein the bearing plate comprises
pressure fins, wherein said pressure fins absorb the operating load of the pressure shield by way of outer surfaces thereof bearing against the pressure shield convexity, and
a planar bearing surface, which is on the opposite side remote from the outer sides of the pressure fins, wherein said planar bearing surface provides support against an adjoining element of the stack of fuel cells.

* * * * *